United States Patent [19]
Ritter et al.

[11] Patent Number: 5,570,084
[45] Date of Patent: Oct. 29, 1996

[54] METHOD OF LOOSE SOURCE ROUTING OVER DISPARATE NETWORK TYPES IN A PACKET COMMUNICATION NETWORK

[75] Inventors: Michael W. Ritter, Los Altos; John Bettendorff, San Jose; George H. Flammer, III, Cupertino; Brett D. Galloway, Campbell, all of Calif.

[73] Assignee: Metricom, Inc., Los Gatos, Calif.

[21] Appl. No.: 268,765

[22] Filed: Jun. 28, 1994

[51] Int. Cl.$^6$ ............................ H04Q 3/00; H04J 3/24
[52] U.S. Cl. ........................ 340/825.05; 340/825.04; 340/827; 370/94.1
[58] Field of Search ........................ 340/827, 825.05, 340/825.04; 370/85.13, 94.1, 94.3; 395/325

[56] References Cited

U.S. PATENT DOCUMENTS

| | | | |
|---|---|---|---|
| 5,095,480 | 3/1992 | Fenner | 340/825.04 |
| 5,239,537 | 8/1993 | Sakauchi | 340/827 |
| 5,313,465 | 4/1994 | Perlman et al. | 370/85.13 |
| 5,347,272 | 9/1994 | Ota | 340/827 |
| 5,353,283 | 10/1994 | Tsuchiya | 370/94.3 |
| 5,383,187 | 1/1995 | Vardakas et al. | 370/94.1 |
| 5,398,012 | 3/1995 | Derby et al. | 340/827 |
| 5,442,633 | 8/1995 | Perkins et al. | 370/94.1 |

Primary Examiner—Michael Horabik
Assistant Examiner—Edward Merz
Attorney, Agent, or Firm—Townsend and Townsend and Crew LLP; Kenneth R. Allen

[57] ABSTRACT

In a packet communication system, loose source routing is employed to permit communication over networks of disparate types, including geographic and path-unaware types. No information resides on a wired access point (WAP). All of the intelligence of the system resides in Name Servers, which provide opaque addresses that end nodes (radios) in a wireless cloud can use to send packets to other end nodes (radios) in other wireless clouds. (A cloud is the set of radios serviced by a particular WAP.) According to the invention, the method employs an ordered list called a path and the network address of a packet consists of such an ordered list of addresses with a "marker" that flags the current destination of the packet and a "direction bit" that tells which direction on the list the next destination is. Each address in the path is type-length-value (TLV) encoded. The address has preferably a 4 bit "type" field, followed by a 4 bit "length" field (indicating length in words) of the value, and then the actual "value" of the address. Each address describes a "place" that the packet must "visit." These "places" may be areas which a packet must traverse, and not necessarily actual node addresses.

10 Claims, 7 Drawing Sheets

METHOD OF LOOSE SOURCE ROUTING OVER DISPARATE NETWORK TYPES IN A PACKET COMMUNICATION NETWORK

BACKGROUND OF THE INVENTION

This invention relates to wireless digital communication systems, and in particular to inter network or wide area network communication protocols.

As various network protocols, such as the Internet Protocol (IP) routing scheme, proliferate for backbone digital communications, it is desirable to provide communication which is transparent to source and to destination. This means that the multilayer protocols must be substantially independent at each layer and not intervene with other layers except when it is timely to process encapsulated information. Two outstanding problems are support of a wired backbone and routing. A need in the present environment of a wired backbone is to use Wired Access Points (WAP) to allow nationwide connectivity of wireless (radio) and/or roaming nodes which use packet communication techniques. Flexibility is needed to solve routing problems. A possible design can be based on loose source routing.

Source routing is packet routing in which the source or origin of a packet specifies the link path to a destination. Source routing has been in use for example in the Internet Protocol environment, as well as in the Token Ring environment. In "strict" source routing, every intermediate node is explicitly specified from the source. In "loose" source routing, intermediate nodes are specified as a set without stating precise routing through the set for so-called "normal" routing.

What is needed is a scheme permitting loose source routing of packets between a source and an intended destination across disparate network types.

SUMMARY OF THE INVENTION

According to the invention, loose source routing is employed in a packet communication scheme to permit communication over networks of disparate types to exchange information. No information resides on a wired access point (WAP). All of the intelligence of the system resides in Name Servers, which provide opaque addresses that end nodes (radios) in a wireless cloud can use to send packets to other end nodes (radios) in other wireless clouds. (A cloud is the set of radios serviced by a particular WAP.) According to the invention, the method employs an ordered list called a path and the network address of a packet consists of such an ordered list of addresses with a "marker" that flags the current destination of the packet and a "direction bit" that tells which direction on the list the next destination is. Each address in the path is type-length-value (TLV) encoded. The address has preferably a 4 bit "type" field, followed by a 4 bit "length" field (indicating length in words) of the value, and then the actual "value" of the address. Each address describes a "place" that the packet must "visit." These "places" may be areas which a packet must traverse, and not necessarily actual node addresses.

The technique enables the creation or introduction of end node devices, such as portable wireless nodes, which need not be changed each time one of the intermediate protocol architectures or end protocol architectures is changed. In other words, the technique allows an extremely extensible addressing structure.

The invention will be better understood by reference to the following detailed description in connection with the accompanying drawings.

DESCRIPTION OF SPECIFIC EMBODIMENTS

Figure 1:
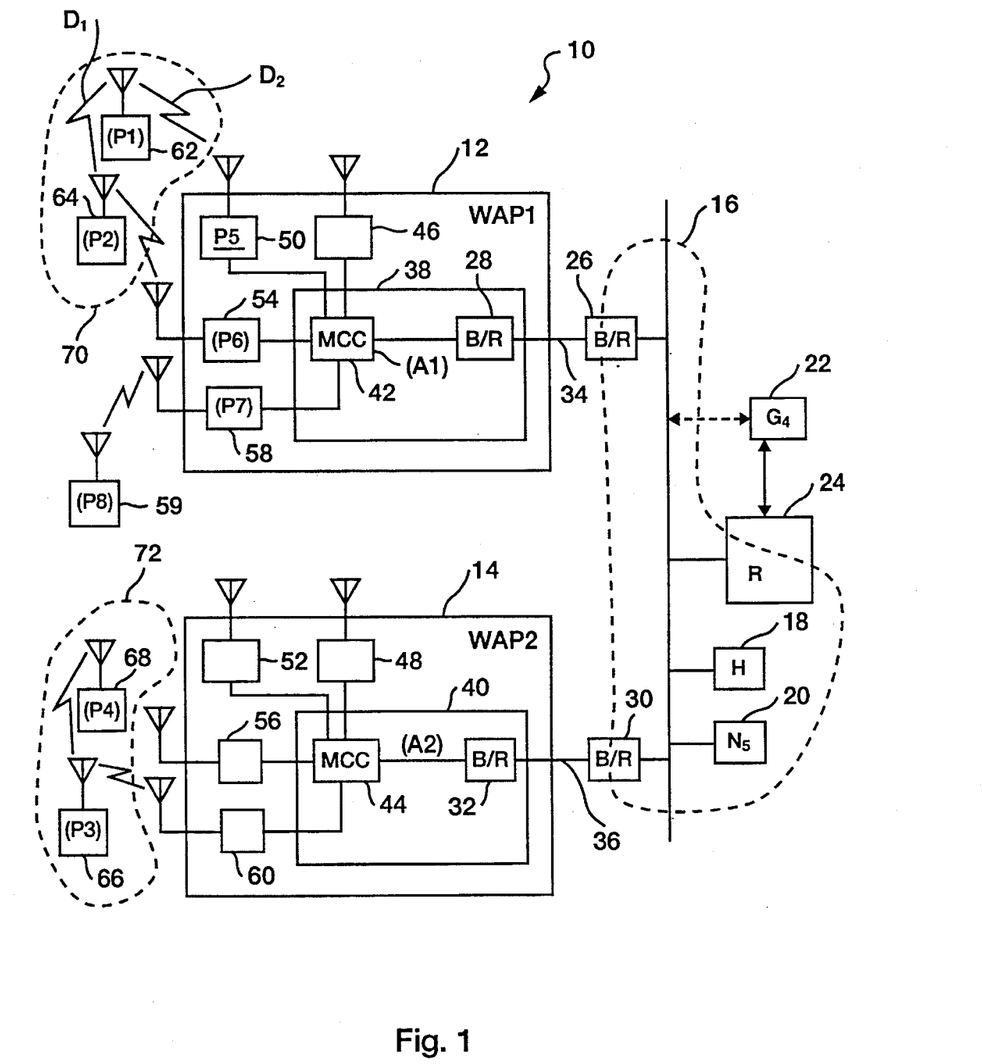
FIG. 1 is a block diagram of a routing system employing a Wired Access Point according to the invention.

Referring to FIG. 1, there is shown a block diagram of a routing system 10 employing Wired Access Points (WAPs) 12, 14 according to the invention. The WAPs 12, 14 are connected to a backbone 16, which in this example is an IP protocol-based backbone having a host element 18 and a name server element 20. The backbone 16 may be connected to an IP node 22 either directly or via a router 24. The backbone 16 is typically connected to the WAPs 12, via bridger/routers 26, 28, 30, 32 at each end of leased lines 34, 36. As part of the WAPs 12, 14 is a gateway element 38, 40 in each of which resides a bridger/router 28, 32 and a node controller 42, 44. The node controllers 42, 44 each are hard-wire coupled to and control a plurality of transceivers 46, 48, 50, 52, 54, 56, 58, 60 which communicate with fixed site (pole top) radios P1 62, P2 64, P3 66 or via a radio relay (P3) with one or more roaming or mobile radios P4 68. The radios in communication with a single WAP 12, 14, which is a source/sink for packets directed from/to radios are considered a cluster 70, 72 for the purpose of loose source routing in connection with a backbone connecting disparate networks. The clusters may be contiguous, overlapping or widely separated, the communication within a cluster generally being carried out according to a coordinated frequency band plan. Packets may be routed anywhere among the disparate systems in accordance with the method of the invention.

The controllers 42, 44 of gateways 38, 40, understand dual routing domain types in a path, one for the radio side, which is a cluster and one for the bridge side, which is generally point-to-point. The addressing depends on the network type. If a packet comes from a radio, the gateway 38, 40 inserts its address in the path, encapsulates the packet, and sends it to the next address on the path (which should be the wired address of the remote WAP.) If a packet comes from the wired network, the gateway deletes its address from the path. The gateway then looks at the next destination to determine which port through which it should send the packet.

Examples will illustrate how packets are routed between various types of nodes within and between clusters or between any two nodes.

Consider the following cases

1) The path is radio to radio within a cluster, such as radio P1 (62) to radio P2 (64), where addresses are only in the radio domain so the path is W(P1), W(P2);
2) The path is radio to remote radio via a wired access point, such as radio P1 (62) to radio P4 (68), where addresses include an intermediate wired access point A2 (14) so the path is W(P1), W(P5), IP(A2), W(P4);
3) The path is radio to wired node, such as radio P1 (62) to wired system G4 (22), where addresses include a wired access point 12 and at least a backbone 16 so the path is W(P1), W(P5), IP(G4).

A key element of the invention is that path elements represent an address and an address type. A standard addressing scheme, such as IP, may be used which is routed using standard IP routing schemes, such as "RIP" which is specified in the RFC internal protocols of the Internet Protocol.

Figure 2:
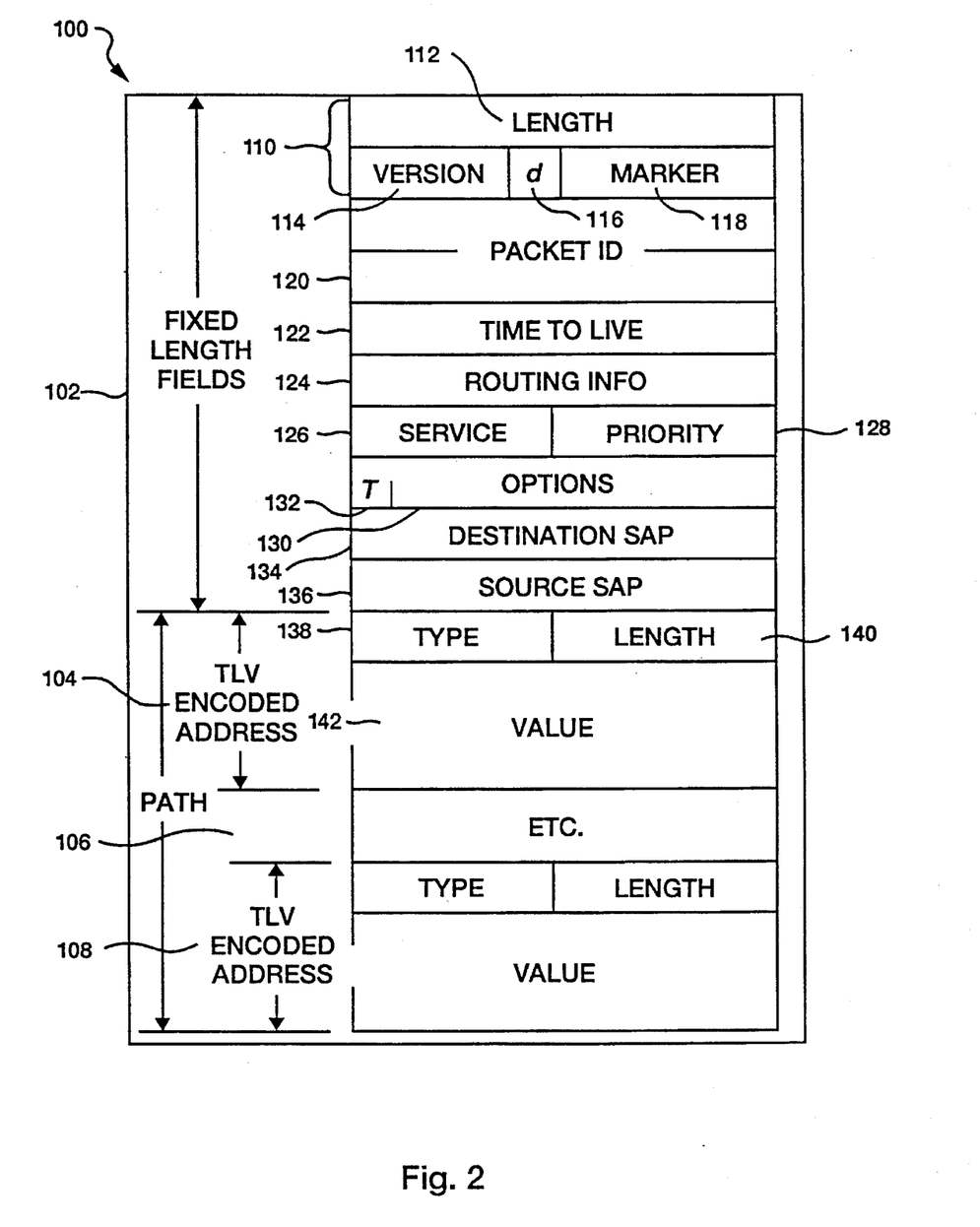
FIG. 2 is a block diagram of a packet illustrating type-length-value address encoding.

The packet format 100 of a specific embodiment is shown in FIG. 2. It comprises a set of fixed length fields 102 and sets of TLV encoded fields 104, 106, 108 of variable length. The fixed length fields 102 include a leader 110 that starts with one byte of length 112 of the entire header in bytes (including the leader itself). Next in the leader 110 is a three bit "version" field 114 for example with the value 0×0 (all zeroes) reserved for future extensions. The fourth field is the direction bit 116, which indicates that the next destination is either after the current source (when the bit is set) or before it (when the bit is clear.) The direction bit is optional. In the alternative, the path can be reordered to reverse the path. Finally, a marker field 118 is provided, which consists of four bits and which is an index to the address of the current destination in the path. The marker is set by the local controller to point to the current destination. Initially, the marker is set to 2, for the first element in the path after the source, and it remains at its current value until the packet is routed to the current destination in the path given by the marker, at which point the marker is incremented, and the packet is routed to the new current destination, e.g., the third element in the path [W(P1), W(P5), IP(A2), W(P4)]. Thus, the path need not be rearranged after every link. In a specific embodiment, the path is limited to 15 ($2^4$-1) possible addresses.

Following the leader 110 are other fixed length fields which are followed by an ordered list of TLV encoded addresses 104, 106, 108 that make up the path.

The first fixed length field following the leader 110 is a two byte Packet ID 120, which is used along with the original source to identify the subject packet. The next one byte field is "time to live" 122 to assure that stray packets are eventually extinguished. The next field may contain special routing information 124. The next byte contains quality-of-service information 126 and priority information 128. The next byte contains a bit field of options 130, the first bit of which is the trace bit 132, which is used to turn on tracing. The other bits are reserved for future definition. The next byte is the destination service access point (SAP) 134 and the final byte is the source SAP 136.

The remaining elements form the path as TLV-encoded addresses 104, 106, 108. Each TLV-encoded address is encoded as a Type, Length, Value triplet 138, 140, 142. The Type 138 consists of four bits representing sixteen possible values 0×0 to 0×F in two-byte words providing sufficient options for future extensions. It is followed by four bits of length 140 which encode the length of the value field of the address (in words). (If an address takes an odd number of bytes, an extra byte of padding is added.) The specification of length explicitly aids in parsing the word. It allows the address to be ignored so that an irrelevant address value can be skipped.

The following types are defined:

Type=0,

Type=1, and

Type=2.

Type 0 is an address defined according to the geographic addressing scheme of Metricom, Inc. of Los Gatos, Calif., which is further subtyped by the length. A Metricom address is an addressing scheme currently used in a wireless personal data service by Metricom-compatible wireless nodes.

Figure 3:
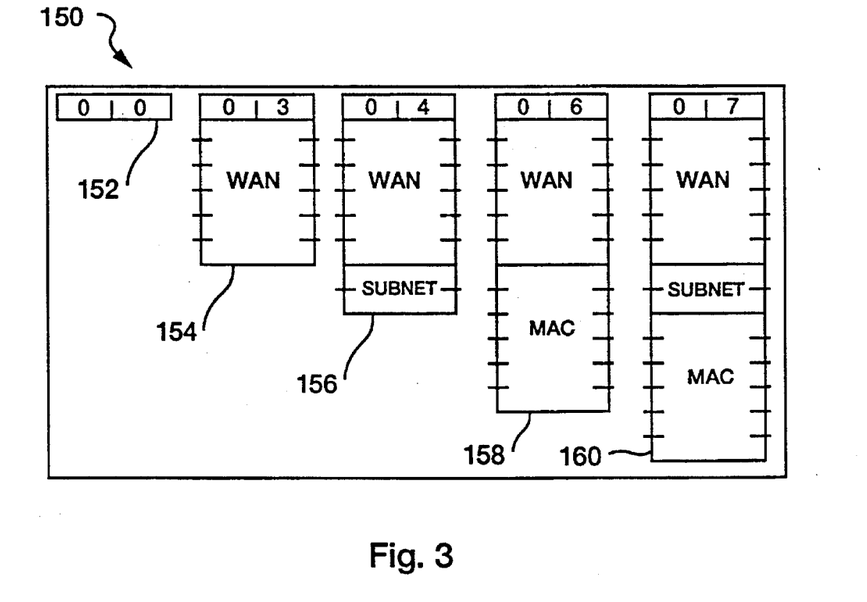
FIG. 3 is a chart illustrating a selection of packet types useful in accordance with the invention.

FIG. 3 illustrates the normal Metricom address types 150 (Type 0) and shows the lengths. The first field is an optional 6 byte Wide Area Network Address; the second field is an optional 2 byte sub-network address, the third field is an optional 6 byte MAC (Media Access Control) address. There are five possible lengths 152, 154, 156, 158, 160 for a Type 0 address: 0, 3, 4, 6, or 7, the unique lengths defining a unique signature for this type of packet. A Type 0, Length 0 address is an indicator to use the MAC layer addresses at the level below the network level. It also means that the packet is definitely addressed to the current node, and that the current node is to communicate with a Metricom device.

A Type 1 address is used to solve the cul-de-sac routing problem. In a specific embodiment it may be a WAN (Wide Area Network) address (a station group) and a radial distance from a geographic point represented by that WAN address. Accordingly, the routers may route the packet towards the WAN address so that whenever the packet is received by a router within the distance specified of the WAN address, it removes the WAN address from the path and continues forwarding the packet to the address at the head of the path. A Type 2 address is an IP (Internet Protocol) address. Its length is 2 words. Other types can be defined as needed.

Figure 4:
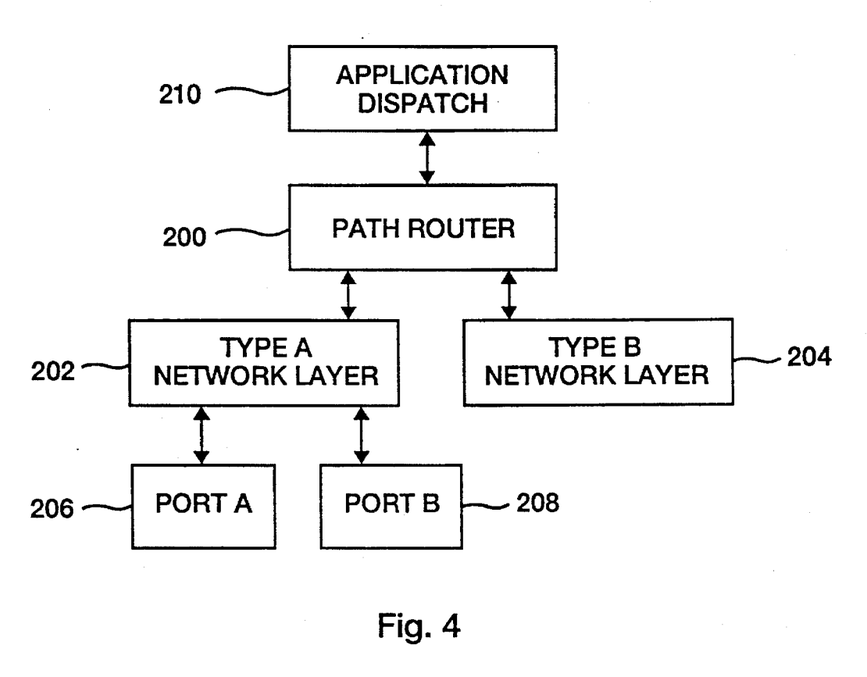
FIG. 4 is a block diagram of the architecture of the interrelation of software modules which might be employed in accordance with a specific embodiment of the invention.

Referring to FIG. 4, there is a block diagram of the architecture showing the interrelation of software modules which might be employed in accordance with a specific embodiment of the invention. A path router 200 sits on top of independent network layers A 202 and B 204 each representing a network type. These provide "network layer" routing between path elements. Each of the network layers has zero to several dedicated communication ports A (206) and B (208). The path router 100 has sufficient intelligence to know whether to continue routing to another path layer (A to B) or to pass encapsulated contents of a packet to an application program (via an application dispatch element 210).

Figure 5:
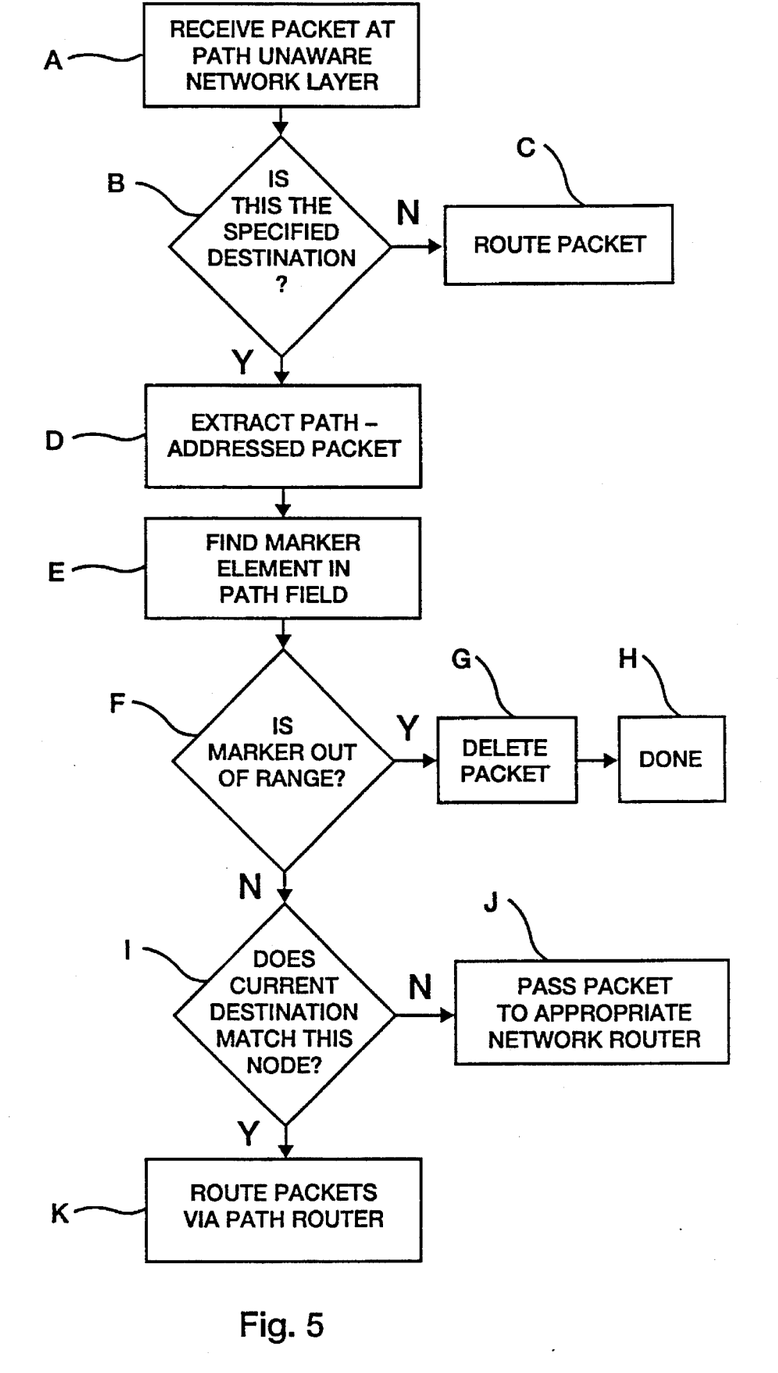
FIG. 5 is a flow chart of a control protocol of a "path unaware" network layer, i.e., a layer which does not understand "path addressing."
Figure 6:
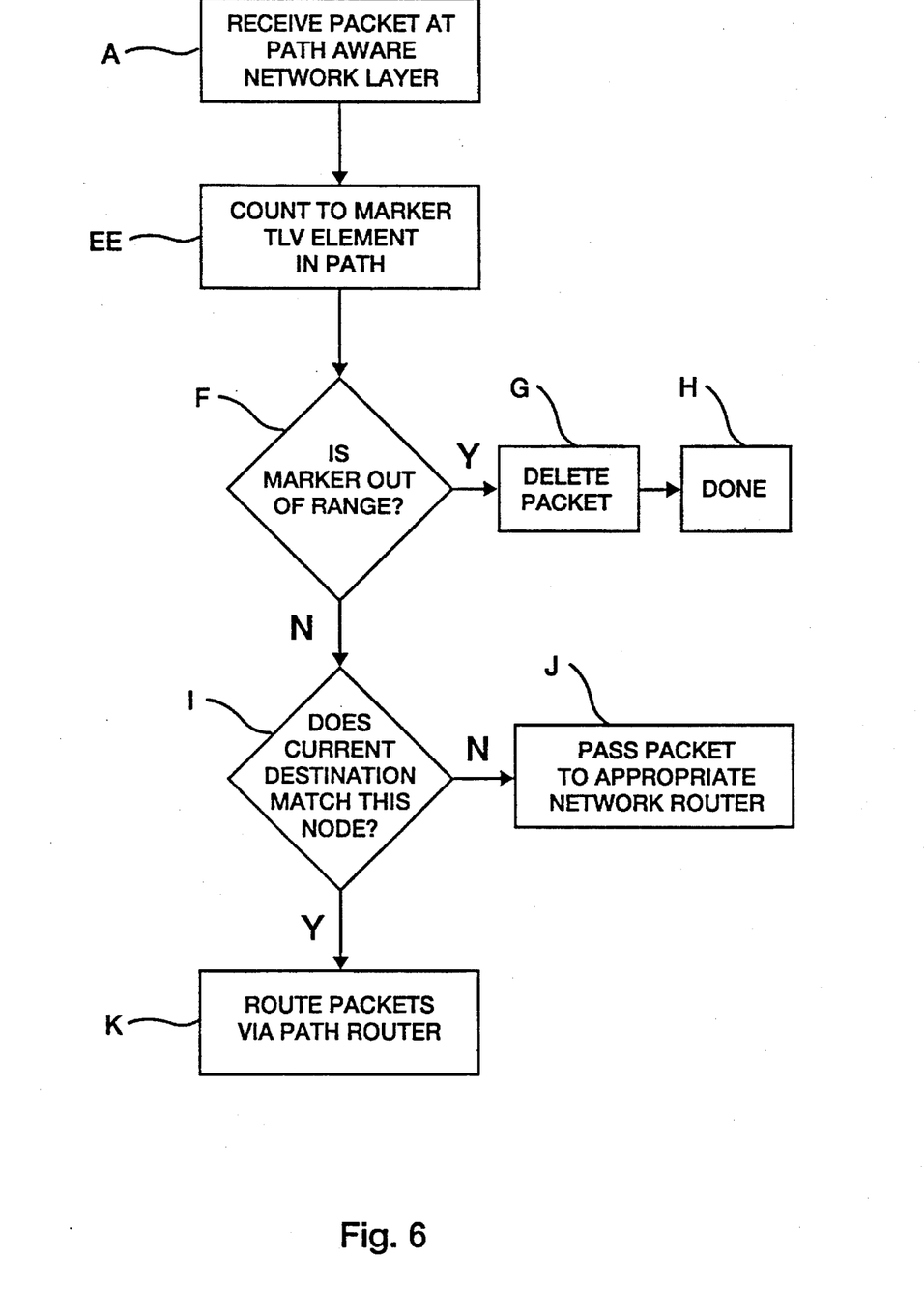
FIG. 6 is a flow chart of a control protocol of a "path aware" network layer according to the invention.

There are different types of network layers: those that do not understand path addressing, such as the Internet Protocol (FIG. 5) and those that do understand path addressing, such as the Metricom Microcellular Data Network (MCDN) control protocol (FIG. 6). Referring to FIG. 5, there is shown the logic or flow chart of a control protocol of a "path unaware" network layer, i.e., a layer which does not understand "path addressing." The path address contains the information as shown in FIG. 2, the user data being encapsulated in the native layer packet. In FIG. 5, a packet is received at a path-unaware network layer (Step A). The local controller checks whether the encapsulating packet is intended for the current network layer destination (Step B) and if not it routes the encapsulating packet according to the path unaware protocol (Step C), such as the IP protocol on the backbone; otherwise, the local controller extracts the path-addressed packet from the encapsulating packet (Step D); thereafter the controller looks for and finds a marker element in a path address sequence, counting it out to the relevant element in the path (Step E). A test is applied to determine whether the marker element is within the range defined for the layer (Step F); if not, the packet is deleted (Step G) and processing by the current node is terminated in a potential error condition (Step H). If the packet is intended for this destination (Step F), the controller tests to see if the current destination designation matches this node (Step I); if not, the controller passes the extracted packet to the appropriate network router (Step J); if yes, the controller at this network layer then turns the extracted packet over to the path router (Step K) whereby it is dispatched to an application or passed to another network layer (FIG. 4).

If the network layer understands path addressing, there is no need to perform the preliminary processing and extraction, as the network layer can directly interpret the path addressing of the packet. Referring to FIG. 6, therefore, a packet is received at a path-aware network layer (Step A). Thereafter the controller looks for and finds a marker element in a path address sequence, counting it out to the TLV element in the path (Step EE). A test is applied to determine whether the marker element is within the range defined for the layer (Step F); if not, the packet is deleted (Step G) and processing by the current node is terminated in a potential error condition (Step H). If the packet is intended for this destination (Step F), the controller tests to see if the current destination designation matches this node (Step I); if not, the controller passes the extracted packet to the appropriate network router (Step J); if yes, the controller at this network layer lever then turns the extracted packet over to the path router (Step K) whereby it is dispatched to an application or passed to another network layer.

Figure 7:
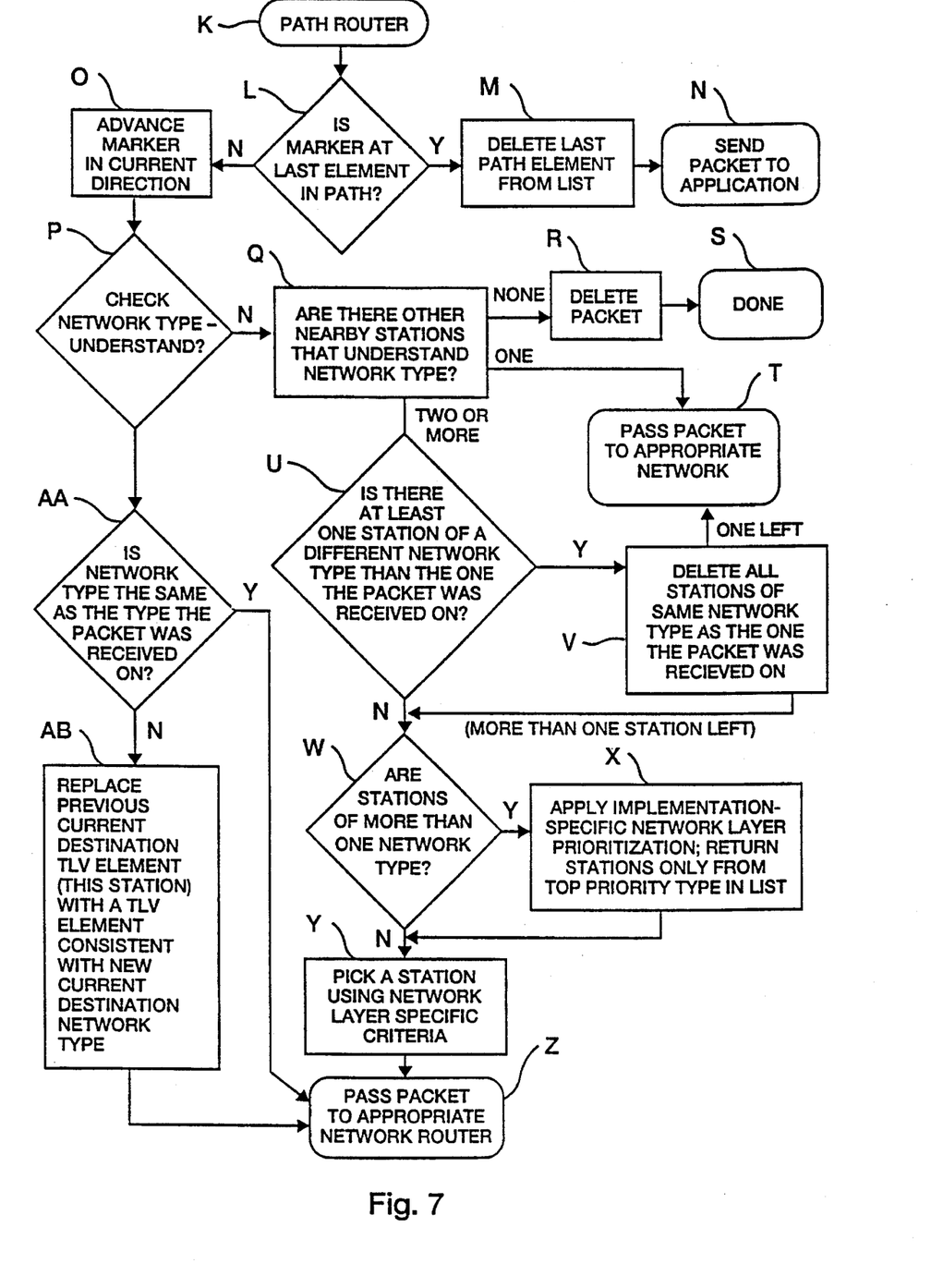
FIG. 7 is a flow chart of a control protocol of a path router.

The flow logic of the path router according to the invention is shown in FIG. 7. The controller first checks to see if the marker is at the last element in the path (Step L). If the direction is forward (=1), then the marker is expected to be at N, where N is the TLV element in the path. If yes, the controller deletes the last path element from the path list (Step M) and passes the packet to the application (Step N). If it is not the last element in the path, the controller increments the marker in the current direction (Step O). If the direction is equal to 1, the controller adds 1 to the marker; if the direction is equal to 0, the controller subtracts 1. The controller then checks the network type field of the packet to determine if it understands the network type (Step P). If not, it checks (in a local list of capabilities) to determine if other (nearby) stations understand the listed network type (Step Q). If there are none, the only thing the controller can do is delete the packet (Step R) and quit analyzing the packet (Step S). If there is one nearby station, the controller then forwards that packet to that station (Step T). If there is more than one such network, the controller tests to see if there is at least one station of a different network type than the network the packet was received on (Step U). If so, then the controller deletes the stations (from its list) of the same network type as the one the packet was received on (Step V) and if only one remains, it passes the packet on to the appropriate network (Step T). The logic here is to move the packet forward by sending out the packet on a different network type than the network type through which the packet was received. If more than one station remains, the controller then tests to see if the stations are of more than one network type (Step W). If yes, a prioritization scheme is applied, namely there is an implementation-specific network layer prioritization which returns the stations only from the top priority type in the list (Step X). This step is needed only if there are three or more network types defined at a given station.

Once stations of a single network type are selected (Steps W or X), the controller chooses a station according to any network layer specific criteria (Step Y) and passes the packet to the appropriate network router (Step Z).

Where the network type is understood (Step P), the controller checks to determine if the network type is the same as the network type from which the packet was received (Step AA) and if so, simply passes the packet to the appropriate network (Step Z). If not, the controller substitutes the previous current destination TLV element in the packet (which was the controller's own station) with a TLV element that is consistent with the new current destination network type (Step AB), since the controller understands the new network type and then passes the packet to the appropriate network (Step Z).

In summary, the path router substitutes for the TLV element one which is relevant to the network type of the next network to be routed on, thus expediting the relaying of packets.

When the packet is passed to the network router, a decision must be made as to whether the router is network aware. If it is network aware, the network router routes the packet to the current destination. If it is not, the network router encapsulates the packet in the native network layer header, copying the routing destination from the current destination (e.g., the IP destination address) and then routing the packet.

It is possible to provide a controller configuration at a station in which one portion of the control function contains knowledge of one network type and another portion of the control function contains knowledge of a different network type. This configuration is an equivalent of a two-network type station embodied as two one-network type stations connected by a point-to-point connection. Since the one station doesn't know the address used by the other station, the solution is to delete current destination entirely for intra-station communications, adding back the current destination for outgoing packets from either port. Packets are merely forwarded over the point-to-point link. Having removed the destination address, in the reverse direction, the controller also removed the source address. It can be replaced at the other end of the link, since it is removed.

Figure 8:
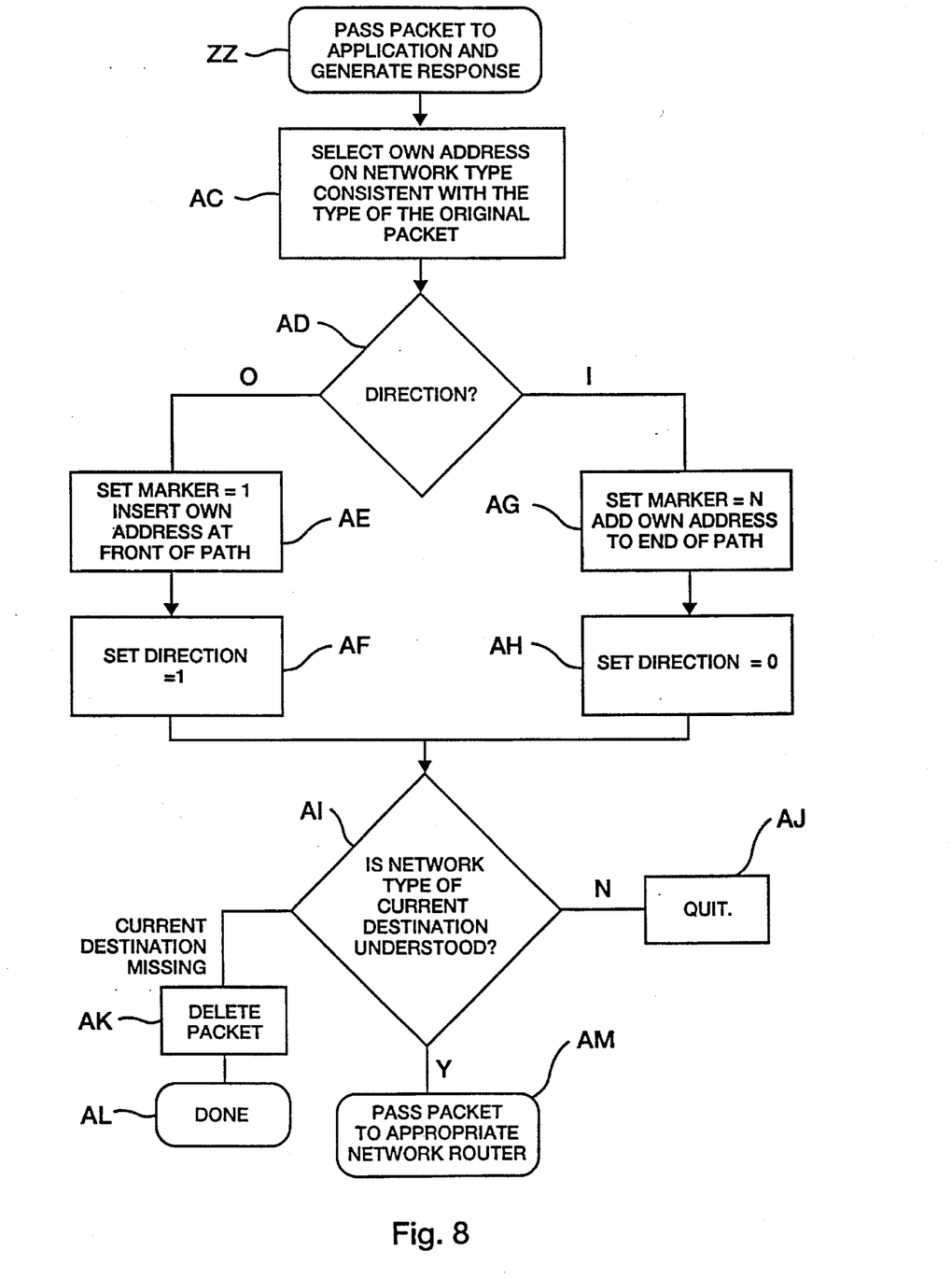
FIG. 8 is a flow chart of a control protocol for return path via a network router.

To reflect a packet sent to an application back to its source or to otherwise generate a response, a reverse path must be followed. Referring to FIG. 8, a packet passed to an application (Step ZZ) normally generates a response message. The controller selects its own address (according to the appropriate network type) which is consistent with the network type of the received packet (Step AC). The direction bit is tested (Step AD). If the direction bit is 0, the controller sets the marker to 1 (initializes it to the beginning of the path for forward direction), inserts its own station address at the front of the path (Step AE) and sets the direction bit to 1. If the direction bit is 1, the controller sets the marker to N, where N is the number of path elements before an insertion (initializes it to the end of the path relative to forward direction), inserts its own station address at the end of the path, i.e., at the position N (Step AG) and sets the direction bit to 0 (Step AH). After either step, the controller inspects the network type of the packet to determine if the indicated network type is understood (Step AI). If it is not, the controller can do nothing so it quits processing the packet (Step AJ). If the current destination is missing, it simply deletes the packet (Step AK) and is done (Step AL). If it does understand the network type of the current destination, the controller passed the packet to the appropriate network router (Step AM).

Referring again to FIG. 1, a name server NS element 20 is provided in the IP network to service various requests for information about stations known in the various disparate networks. Using the information passed from the name server, either directly or indirectly, back to the querying stations, paths can be constructed between sources and destinations according to the loose routing protocol. A construction of paths across various clusters in FIG. 1 is a simple exercise.

The invention has now been explained with reference to specific embodiments. Other embodiments will be apparent to those of skill in the art. It is therefore not intended that this invention be limited, except as indicated by the appended claims.

What is claimed is:

1. A method for digital packet communication between nodes in disparate networks including path unaware network layer types and path aware network layer types, said method comprising:
   a) receiving a typed encapsulating packet which encapsulates a path-addressed packet at a first network layer, said first network layer being path aware;
   b) directing the encapsulating packet to a path router;
   c) determining by testing for type at said path router whether said typed encapsulating packet should be passed to a second network layer or to an application and whether said second network layer is path aware or path unaware; and
   d) passing said encapsulating packet to the application if said encapsulating packet is addressed to said application, or passing said encapsulating packet to said second network layer if not so addressed by routing said encapsulating packet according to a path unaware protocol if said second network layer is path unaware; otherwise routing said encapsulating packet according to a path aware protocol if said second network layer is path aware.

2. A method for digital packet communication between nodes in disparate networks including path unaware network layer types and path aware network layer types, said method comprising:
   a) receiving an encapsulating packet which encapsulates a path-addressed packet at a first network layer of a first type;
   b) if said first type is path unaware, checking whether said encapsulating packet is intended for the current destination and if not, routing said encapsulating packet according to said path unaware protocol; otherwise
   c) extracting said path-addressed packet from said encapsulating packet; thereafter
   d) finding a marker element in a path address sequence in the path-addressed packet and determining whether destination indicated by the marker is out of range for the current node, and if not in range, aborting processing; else if in range
   e) testing to determine whether the current destination indicated by the marker matches the current node, and
   f) if no match, passing on the path-addressed packet to another network router; else, if the current destination indicated by the marker matches the current node, passing on the path-addressed packet to a network router for distribution to another network layer and to applications; and if said network layer is path aware, performing steps e) through f).

3. the method according to claim 2 further including the step of;
   routing the path-addressed packet received at the path router and not destined for an application to a next appropriate network router.

4. The method according to claim 2 further including the step of determining whether the current station understands the network type of the received packet and if so passing the packet to the next appropriate network router.

5. The method according to claim 2 further including the steps of:
   determining whether the current station understands the network type of the received packet and if not, processing the packet according to the understanding of the current station, else
   determining whether a next destination network type is of the same type as the network type from which the packet was received, and if so, processing the packet according to the network type, else
   substituting a type-length-value element in the packet which is recognizable by the next destination network type.

6. The method according to claim 2 further including the steps of:
   determining whether the current station understands the network type of the received packet and if so, processing the packet according to the understanding of the current station, else
   attempting to locate other network routers which do understand the network type of the received packet; and
   relaying the received packet to an appropriate network router.

7. A method for digital packet communication between nodes in various networks including path aware network layer types, said method comprising:
   a) designating a destination path element for a packet by means of a type-length-value element specific only to one station of a group of destinations, where said one station of said group is not necessarily a target destination;
   b) selecting a route for said packet to a station within said group; thereafter
   c) transmitting said packet to said station within said group;
   d) receiving said packet at said station at a first network layer, said packet being a path-addressed packet;
   e) directing said path-addressed packet to a path router;
   f) determining at said path router whether said path-addressed packet should be passed to a second network layer or to an application; and
   g) passing said path-addressed packet to the application if so addressed and to a second network layer if not so addressed.

8. The method according to claim 7 wherein said networks include a geographically-addressed network.

9. The method according to claim 8 wherein said specifying step includes specifying a set of stations by means of a single geographic address and a radial distance from said geographic address for directing said packet to any station within a radius of said geographic address.

10. The method according to claim 7 wherein said networks include a non-geographically-addressed network.

* * * * *